United States Patent [19]

Valenzona et al.

[11] 4,342,946

[45] Aug. 3, 1982

[54] TIMED AUTOMATIC HEADLIGHT SHUT-OFF

[75] Inventors: Joseph F. Valenzona, Harbor City; Lloyd Hewitt, Woodland Hills, both of Calif.

[73] Assignee: Orion Industries, Inc., Compton, Calif.

[21] Appl. No.: 146,471

[22] Filed: May 5, 1980

[51] Int. Cl.³ .............................................. B60Q 1/02
[52] U.S. Cl. ...................................... 315/82; 315/83; 361/392; 307/10 LS
[58] Field of Search ....................... 315/82, 83; 174/65, 174/65 SS, 65 G, 50, 52 R; 361/403, 392; 307/10 LS

[56] References Cited

U.S. PATENT DOCUMENTS

| 1,444,057 | 2/1923 | Bosley | 174/65 R |
| 2,959,633 | 11/1960 | Palmer et al. | 174/50 |
| 3,530,333 | 9/1970 | Roberts | 315/83 |
| 3,626,239 | 12/1971 | Brock | 315/83 |
| 3,628,085 | 12/1971 | Brock | 315/82 |
| 3,723,807 | 3/1973 | Tozzi | 315/83 |
| 3,798,500 | 3/1974 | Florence et al. | 315/82 |
| 4,095,043 | 6/1978 | Martin et al. | 174/65 R |
| 4,178,057 | 12/1979 | McCormick | 174/65 R |

Primary Examiner—Saxfield Chatmon, Jr.
Attorney, Agent, or Firm—Fulwider, Patton, Rieber, Lee & Utecht

[57] ABSTRACT

A timing circuit is provided for the headlights of an automotive vehicle to maintain the headlights in an illuminated condition for an adjustable, predetermined time after the vehicle ignition is turned off. The timing circuit is housed in an enclosed casing that includes an access port that allows insertion of a tool to effectuate timing adjustment. The casing includes a locking mechanism for immobilizing insulated electrical wires relative to the casing at locations displaced from the contact terminations of those wires.

9 Claims, 7 Drawing Figures

U.S. Patent  Aug. 3, 1982  4,342,946
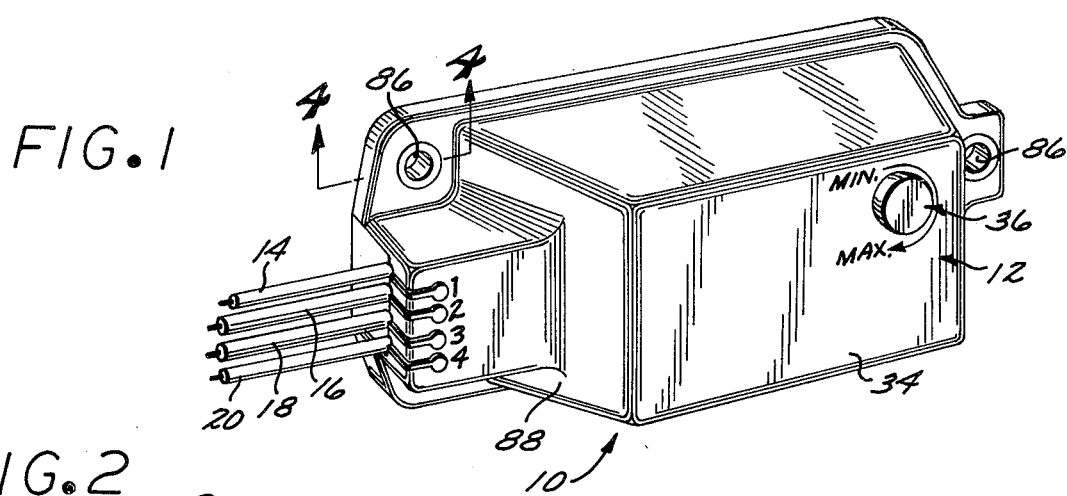
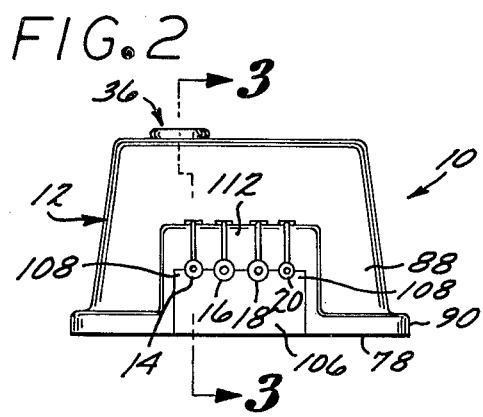
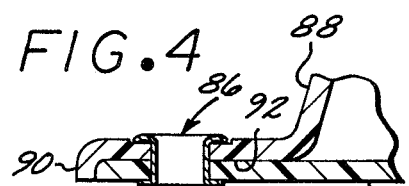
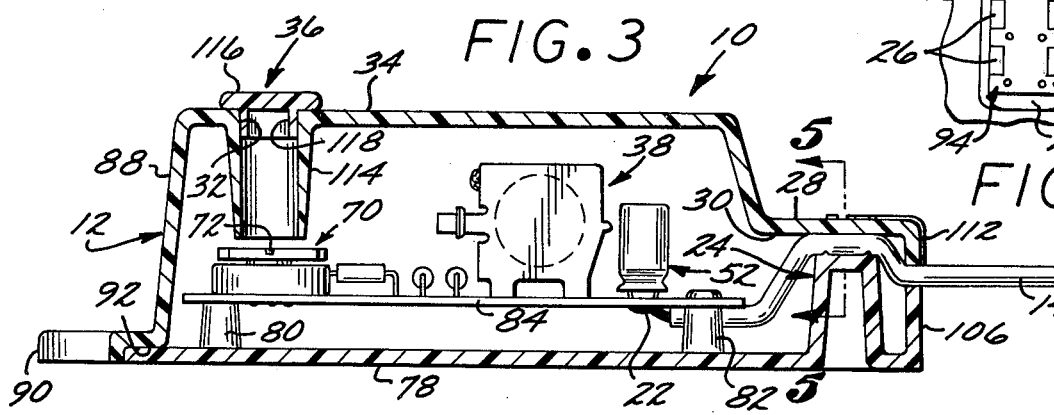
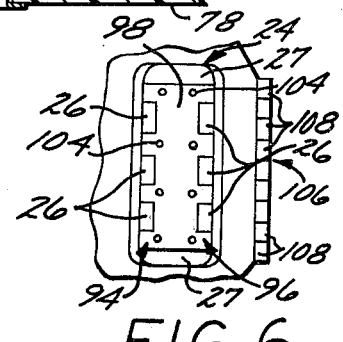
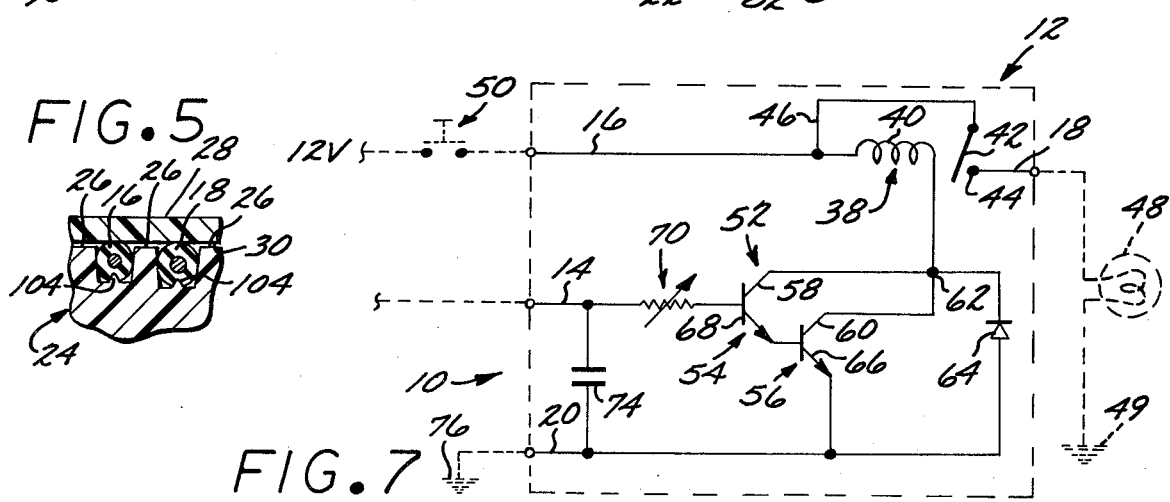

TIMED AUTOMATIC HEADLIGHT SHUT-OFF

BACKGROUND OF THE INVENTION

1. Field of the Invention

The present invention relates to automated timing delay circuits for shutting off automotive vehicle headlights a predetermined time after the vehicle ignition has been turned off.

2. Description of the Prior Art

Various devices are commercially available for automatically extinguishing automobile headlights after a delay once the vehicle ignition has been turned off. However, none of the devices currently available provides a complete, compact, self-contained casing for the timing circuit with a dustproof, unsealable access port for adjusting the time delay of the shut-off system. The automatic shutoff device of the invention is constructed as an encapsulated unit which locks and longitudinally secures the insulated electrical lead wires that extend to the vehicle electrical system. The insulated wires are locked at locations displaced from their contact termianations. This allows the base and cover for the casing to be permanently fastened together without danger that the lead wires thereto might be pulled from the contact terminations during installation or use.

SUMMARY OF THE INVENTION

The present invention is an automotive vehicle light shut-off device in which an enclosed casing has a mechanism for locking the insulated electrical lead wires extending thereto. The lead wires are locked relative to the casing at locations within the casing displaced from the contact terminations thereof. The casing also defines an access port for insertion of a tool to effectuate adjustment of the timing circuit to increase or decrease the time interval after the vehicle ignition has been turned off during which the headlights of the vehicle remain illuminated. The access port is sealable by a removable plug positioned therein to prevent the entry of dust, smoke and other contaminants into the casing. An annular sleeve extends inwardly from the access port and serves as a guide for a screwdriver or other tool which may be inserted through the access port to adjust a variable resistor pot that is connected in the timing circuit.

The casing containing the timing circuit can be mounted under the vehicle dashboard, on the vehicle dash or within any hidden compartment within reach of the vehicle electrical system. Preferably four insulated electrical lead wires extend from the casing and are held in locked disposition at locations displaced from the contact terminations. Also, numerical indicia are preferably defined on the outer surface of the casing in association with each of the electrical lead wires to facilitate an understanding of the installation. A user with minimal knowledge of vehicle electrical systems is thereby able to quickly and easily install the light shut-off device of the invention. Also, with the circuit configuration of the preferred embodiment of the invention, the light shut-off control can be installed on all vehicles employing a 12 volt direct current negative ground system. All standard domestic and imported vehicles employ such a polarity. Installation is greatly facilitated by constructing the casing to completely enclose the control circuit of the invention while allowing adjustment of the timing interval and guarding against the application of tension on the contact terminations through the insulated wires. Written instructions for installation can be provided in association with particular models of automotive vehicles. The user merely locates the instruction steps in the written instructions for the vehicle upon which the light shut-off control is to be installed and follows those installation steps which specify the points to which each of the four insulated electrical leads are to be connected.

The timing shut-off control of the invention serves as a protective device for both personal safety and for the automotive vehicle. A person can park the vehicle after dark in a secluded neighborhood and lock the vehicle while the shut-off control holds the headlights on even after the key is removed from the vehicle ignition. The headlights remain on while the individual walks to a dwelling. The vehicle headlights illuminate the pathway so that an individual is not likely to stumble and fall. The headlights also serve to illuminate the area so that suspicious individuals lurking in the area are visible at a distance, and an individual is thereby able to take any measures necessary for selfprotection. The timing of the circuit can be controlled in advance to allow a person sufficient time to safely enter a building while the vehicle lights remain on. Thereafter, the headlights will be extinguished automatically and will remain off until the vehicle ignition is again turned on. If the vehicle ignition is not turned on again until daylight, the headlights should be manually shut-off when the vehicle is restarted.

The automatic light shut-off control of the invention also protects the vehicle battery from running down if the headlights are inadvertently left on. This frequently occurs when headlights are initially turned on while driving in the dark, in rain or in fog, and where visibility improves significantly before the vehicle ignition is turned off. In many such instances the vehicle driver simply forgets that the headlights are on because the initial driving conditions required the use of headlights, even though the illumination from the headlights may no longer be warranted or noticed. With the control circuit of the invention, the headlights will remain on for only a brief period once the vehicle ignition is turned off, and will thereafter shut-off after an interval which can be adjustably varied from approximately 30 seconds to three minutes. This protects the vehicle from excessive battery drain so that the vehicle can be readily started again later.

The invention can be described with greater clarity and particularity by reference to the accompanying drawings.

DESCRIPTION OF THE DRAWINGS

FIG. 1 is a perspective view of the casing of the automotive vehicle light shut-off device of the invention.

FIG. 2 is a left end view of the casing of FIG. 1.

FIG. 3 is a sectional elevational view taken along the lines 3—3 of FIG. 2.

FIG. 4 is a sectional detail taken along the lines 4—4 of FIG. 1.

FIG. 5 is a sectional detail taken along the lines 5—5 of FIG. 3.

FIG. 6 is an isolated plan detail of a portion of the base of the casing of the invention.

FIG. 7 is a schematic diagram of the light shut off control of the invention.

DESCRIPTION OF THE EMBODIMENT

FIG. 1 illustrates the automotive vehicle light shut-off device 10 of the invention and the enclosing oblong casing 12 which is shaped generally in the form of a truncated quadrilateral pyramid in which the sides are of trapezoidal shape. The casing 12 is constructed to lock the insulated electrical lead wires 14–20 at locations displaced from the contact terminations thereof, indicated at 22 in FIG. 3. The locking function is performed by a raised tower shaped platform 24 with molded wire separating posts 26 and 27 formed thereon, and by a molded shelf 28, the underside 30 of which coacts with the wire separating posts 26 and 27 to frictionally engage the insulated wires, as illustrated in FIGS. 3, 5 and 6. An access port 32 is defined in the rectangular top surface 34 of the casing 12 and a removable plug 36 is positioned therein as illustrated in FIGS. 1–3.

The circuitry of the light shut-off control of the invention is illustrated schematically in FIG. 7. A normally open relay 38 is located within the casing 12 and has a coil 40, an armature 42 and an armature contact 44. The armature 42 is coupled to a first side of the coil 40 by an electrical connector 46, while the armature contact 44 is coupled to the electrical lead wire 18 for connection to the headlights and taillights of the vehicle, illustrated diagrammatically in FIG. 7 as a single light 48 grounded at 49. It is to be understood that the light 48 in FIG. 7 represents all of the vehicle headlights and taillights collectively which are in actuality connected together in parallel. Another of the insulated electrical lead wires 16 is connected to the first side of the coil 40 of the relay 38 and also to the headlight and taillight switch 50, which in turn is coupled in circuit to the positive terminal of the 12 volt vehicle electrical storage battery.

The automotive vehicle light shut-off device 10 also includes a Darlington transistor pair 52 comprised of transistors 54 and 56. The collectors 58 and 60 of the transistors 54 and 56, respectively, are tied together at the junction 62 and are connected to the second side of the relay coil 40 of the relay 38. A diode 64 is coupled to the emitter output of the Darlington transistor pair 52, which is the emitter 66 of the transistor 56. Another of the insulated wires 14 is coupled to the base input 68 of the Darlington transistor pair 52, which is the base of the transistor 54. A variable resistor pot 70 is located in circuit between the insulated wire 14 and the base input 68. The variable resistor pot 70 is positioned within the casing 12 in alignment with the access port 32 thereof, as illustrated in FIG. 3. The variable resistor pot 70 may be readily adjusted by a screwdriver which can be inserted through the access port 32 when the plug 36 is removed. Manipulation of a screwdriver in the screw slot 72 varies the resistance of the pot 70. A capacitor 74 is connected between the emitter output 66 of the Darlington pair 52 and the wire 14. Preferably, the emitter output 66 is also grounded at 76 by the insulated lead wire 20, as illustrated in FIG. 7.

The casing 12 is constructed of two molded parts. One of these parts is a generally flat base 78 upon which the raised platform 24 and an edge parapet 106 are molded. Upstanding circuit board support pedestals 80 and 82 are also molded onto the base 78 to support a planar circuit board 84 parallel thereto as illustrated in FIG. 3. The circuit board 84 bears the circuit components illustrated in FIG. 7. Circular openings are defined in the casing base 78 on either side of the raised platform 24 and at the extreme opposite end of the base 78 to receive rivets 86, one of which is illustrated in detail in FIG. 4.

The other molded part of the casing 12 is a hollow concave cover 88 which has a major, box-like enclosure covering the circuit board 84 and a smaller enclosure with a roof-like shelf 28 which extends over the platform 24 of the base 78. The cover 88 includes at its periphery a lateral, interiorally disposed shoulder 92 about a major portion of its perimeter, and a turned over edge retaining rim 90. The perimeter of the base 78 seats upon the shoulder 92 and is laterally entrapped within the rim 90, as illustrated in FIGS. 2–4. Circular openings are defined in the shoulder 92 of the cover 88 at locations corresponding to those on the base 78. Flange headed rivets 86 are inserted from beneath the base 78 and through the circular openings both in the base 78 and the cover 88 of the casing 12. The upper extremities of the rivets are bent outwardly to form opposing collars that hold the base 78 in juxtaposition against the shoulder 92 of the cover 88 and within the confines of the edge rim 90, as illustrated in detail in FIG. 4.

As illustrated in FIG. 6 the platform 24 on the base 78 is formed with two parallel rows 94 and 96 of upright posts 26 of rectangular cross section. The posts 26 rise from an elevated floor 98 of the platform 24 extending laterally between the rows 94 and 96. The posts 26, together with elongated end retaining posts 27, serve as wire separating posts and define channels therebetween which receive the insulated wires as illustrated in FIG. 5. Very small, short pointed conical protuberances 104 rise from the floor 98 of the platform 24 adjacent each channel between the upright wire separating posts 26 and 27. These protuberances 104 serve to assist in locking the insulated wires 14–20 in longitudinally immobile fashion between the platform 24 and the shelf 28, as illustrated in FIG. 5.

The base 78 is also formed with a crenelated edge parapet 106, illustrated in FIGS. 2,3 and 6. The edge parapet 106 defines crenels 108 thereon which are longitudinally offset from the wire separating posts 26 and 27 on the platform 24. That is, the wires 14–20 cannot extend in a straight path in the channels between the posts 26 and 27 on the platform 24 through the gaps between crenels 108 on the parapet 106. Instead, the parapet 106 is somewhat shorter than the platform 24, so that the wires 14–20 are kinked in passing between the separating posts on the platform 24 and the crenels on the parapet 106 as illustrated in FIG. 3. An edge lip 112 on the cover 88 of the casing 12 coacts with the crenels 108 of the edge parapet 106 to frictionally engage the insulated wires 14–20, as illustrated in FIGS. 2 and 3. The edge lip 112 of the cover 88 is crenelated in mating correspondence with the edge parapet 106 of the base 78.

With reference to FIG. 3, an annular sleeve 114 extends inwardly toward the circuit board 84 on the inside of the cover 88 of the case 12 at the annular port 32 therein. The sleeve 114 serves as both a guide for a tool inserted therein in order to adjust the variable resistor pot 70, and also provides a frictionally engageable surface for the plug 36.

The plug 36 is constructed with a disk-shaped cap 116 having a coaxial, longitudinally split cylindrical base 118 of reduced diameter, relative to the cap 116. Because of the longitudinal splits in the cylindrical base 118 of the cap 36, the portions of the base 118 will flex radially inwardly slightly so that they may be inserted into the access port 32 in the cover 88. This resilient construction allows the plug 36 to be removably inserted into the access port 32 to seal the interior of the casing 12 against the entry of contaminants.

In assembling the automotive vehicle light shut-off device 10 of the invention, the wires 14-20 are first secured by solder at electrical connections 22 on the circuit board 84, illustrated in FIG. 3. The circuit board 84 is then secured to the base 78 in position on the circuit board support pedestals 80 and 82, also as illustrated in FIG. 3. The base 78 of the casing 12 is then nested into the cover 88 so that the edges of the base 78 are seated against the shoulder 92 and laterally entrapped by the lip 90, as illustrated in FIGS. 3 and 4. The rivets 86 are then inserted in the three corresponding mating apertures near the periphery of the base 78 and the shoulder 92 of the cover 88 as previously described and as illustrated in FIG. 4.

As the cover 88 and base 78 are brought together, the concial protrusions 104 on the floor 98 of the raised platform 24 penetrate about half way through the insulation surrounding the conductive cores of the wires 14-20, as illustrated in FIG. 5. As the underside 30 of the shelf 28 of the cover 88 is brought into contact with the insulated wires 14-20 that are located in the channels between the upright posts 26 and 27 on the raised platform 22, the wires 14-20 are locked in position relative to the electrical contact terminations 22 thereof and at locations displaced therefrom, as illustrated in FIG. 3. At the same time, the edge lip 112 of the cover 88 bends the wires 14-20 to establish kinks therein and to further lock the wires 14-20 between the crenelations defined in the edge lip 112 and the parapet 106. The wires 14-20 are thereby securely locked relative to the casing 12 so that longitudinal tension thereon will not be transmitted to the electrical contact terminations 22. Such tension frequently occurs during installation and is otherwise likely to create an open circuit condition in one or more of the wires. Such an open circuit condition would cause the device to malfunction.

The removable plug 36 seals the casing 12 against contaminants which might otherwise foul the circuit components of FIG. 6. Nevertheless, the plug 36 can be removed to allow a screwdriver to be inserted into the access port 32 and guided by the sleeve 114 on the inside of the cover 88 to allow a person using a screwdriver to adjust the variable resistor pot 70. Clockwise rotation of the screwdriver within the slot 72, will maximize the interval for which the headlights 48 will remain on after the vehicle ignition as been turned off. Conversely, counterclockwise rotation will minimize this interval. An indicia to this effect is molded onto the cover 88, as illustrated in FIG. 1. Also, a numeric indicia of the numbers 1-4 is associated with each of the wires 14-20 and is likewise molded in relief on the exposed surface of the shelf 28 at the cover 88. These numeric indicia can be easily correlated with installation instructions to ensure proper connection of the wires 14-20 into the electrical system of the vehicle, even by persons without any knowledge of electronics.

In the operation of the circuitry of the invention, closure of the vehicle ignition supplies voltage on lead wire 14 to charge the capacitor 74 and also to provide a base bias to the Darlington transistor pair 52. With the headlight switch 50 closed to provide current on lead wire 16 and with the vehicle ignition turned on, the Darlington transistor pair 52 is actuated by the voltage on lead wire 14 to complete a circuit path to ground through the coil 40 of the relay 38. This closes the armature 42 to close against the armature contact 44 in the relay 38 so that electrical current flows from lead wire 16, through electrical connector 46. Current flows from the electrical connector 46 to the relay armature 42 which is in contact with the armature contact 44. This provides current to the vehicle headlights and taillights 48 through the wire 18.

Once the vehicle ignition is turned off, the voltage is removed from the wire 14. However, because the capacitor 74 has been charged, the base bias to the Darlington pair 52 continues with current being drained through the variable resistor pot 70 to hold the relay 38 closed temporarily.

If the resistor 70 has been adjusted to maximize the delay, a relatively long time elapses during which the capacitor 74 continues to apply a forward bias to the Darlington pair 52. The Darlington pair 52 thereby continues to draw current through the coil 40 of the relay 38 to maintain the armature 42 closed against the armature contact 44 to continue to illuminate the headlights and taillights 48. Eventually, the capacitor 74 will be fully drained and the base bias will be removed from the Darlington pair 52. At this time no further current can flow through the Darlington pair so that the normally open armature 42 of the relay 38 opens, thereby breaking the connection between lead wires 16 and 18 and turning off the headlights 48.

The maximum duration of the interval during which the lights 48 are maintained in an illuminated condition is controlled by maximizing the resistance of the resistor pot 70. Conversely, when the resistance of the resistor pot 70 is minimized, current drains rapidly from the capacitor 74, so that it no longer applies a forward bias to the Darlington pair 52 after a very brief period of time.

As previously explained, the duration of illumination may be adjusted by the user by removing the plug 36 and adjusting the resistor pot 70 with a screwdriver or other tool. Otherwise the plug 36 remains in the access port 32.

The preferred electrical specifications for the electrical components of the invention depicted in FIG. 7 are set forth below:

Capacitor 74—47 microfarads, 16 v±10%
Resistor 70—330 K, ¼ W, 5%
Darlington pair 52—D40Cl
Relay 38—, 12 volts d.c., 20 amp, SPST-N.O.
Diode 64—IN4001

While the foregoing embodiment of the invention illustrated and described represents the preferred form of the invention as envisioned, it is to be understood that numerous variations and modifications of the invention are possible without departing from the fundamental concepts thereof. For example, the interior lights of an automotive vehicle may be controlled by the automotive vehicle light shut-off device of the invention. Accordingly, the scope of the invention should not be construed as limited to the specific implementation described, but instead is defined in the claims appended hereto.

In the claims:

1. A vehicle light time delay deactivation system for maintaining said vehicle lights coupled to a vehicle current source in an activated state for a predetermined time interval subsequent to a vehicle ignition switch being deactivated comprising:

a casing having an opening formed through a wall thereof, said opening being formed in a predetermined location;

relay means coupled to said vehicle lights in series relation for maintaining coupling between said vehicle lights and said vehicle current source for said predetermined time interval;

transistor means coupled in series relation to said relay means for providing amplification to actuate said relay means;

a variable resistor coupled in series relation to a base of said transistor means, said variable resistor being mounted within said casing in aligned relation with said casing opening for adjusting said predetermined time interval at the discretion of the user; and, a capacitor coupled in parallel between an input to said variable resistor and ground for maintaining input current to said variable resistor when said ignition switch is deactivated.

2. The vehicle light time delay deactivation system as recited in claim 1 including a plug member, said plug member being removably insertable within said opening formed through said wall of said casing.

3. The vehicle light time delay deactivation system as recited in claim 2 including an annular sleeve member coincident with said opening, said annular sleeve member extending internal to said casing and coupled to an upper wall of said casing for frictionally engaging said plug member when said plug member is inserted within said opening formed in said casing.

4. The vehicle light time delay deactivation system as recited in claim 1 where said variable resistor includes a screw head adjustment member for adjustment of the resistance of said variable resistor by insertion of a tool through said opening.

5. The vehicle light time delay deactivation system as recited in claim 1 where said variable resistor is mounted on a circuit board located interior said casing, said circuit board being secured to a base member of said casing.

6. The vehicle light time delay deactivation system as recited in claim 1 including:
 (a) a platform member formed interior said casing, said platform member having wire separating posts formed thereon defining channels therebetween;
 (b) a crenelated edge parapet member having crenels longitudinally displaced from said separating posts; and,
 (c) a cover member having a shelf portion, said shelf portion having a lower surface contiguous said separating posts for frictionally engaging insulated wire passing through said channels.

7. The vehicle light time delay deactivation system as recited in claim 6 including an edge lip member coupled to said shelf portion of said cover member, said edge lip member coacting with said edge parapet member for frictionally engaging said insulated wire.

8. The vehicle light time delay deactivation system as recited in claim 7 where said edge lip member is crenelated in corresponding alignment to said crenelated edge parapet member.

9. The vehicle light time delay deactivation system as recited in claim 1 where said casing includes:
 (a) a cover member having a retaining rim defining an interiorally disposed shoulder extending throughout a major portion of the perimeter of said cover member; and,
 (b) a base member insertable within said shoulder and secured to said retaining rim.

* * * * *